United States Patent
Roh

(10) Patent No.: US 11,313,561 B2
(45) Date of Patent: Apr. 26, 2022

(54) COMBUSTOR WITH AXIAL FUEL STAGING SYSTEM AND GAS TURBINE HAVING THE SAME

(71) Applicant: DOOSAN HEAVY INDUSTRIES & CONSTRUCTION CO., LTD., Changwon-si (KR)

(72) Inventor: U Jin Roh, Changwon-si (KR)

(*) Notice: Subject to any disclaimer, the term of this patent is extended or adjusted under 35 U.S.C. 154(b) by 0 days.

(21) Appl. No.: 16/854,953

(22) Filed: Apr. 22, 2020

(65) Prior Publication Data

US 2020/0378604 A1 Dec. 3, 2020

(30) Foreign Application Priority Data

May 30, 2019 (KR) .................. 10-2019-0064046

(51) Int. Cl.
*F23R 3/00* (2006.01)
*F23R 3/34* (2006.01)
*F23R 3/28* (2006.01)
*F01D 9/02* (2006.01)

(52) U.S. Cl.
CPC .............. *F23R 3/346* (2013.01); *F23R 3/286* (2013.01); *F01D 9/023* (2013.01); *F05D 2240/35* (2013.01); *F23N 2241/20* (2020.01); *F23R 2900/00017* (2013.01)

(58) Field of Classification Search
None
See application file for complete search history.

(56) References Cited

U.S. PATENT DOCUMENTS

| | | | |
|---|---|---|---|
| 2011/0265484 A1* | 11/2011 | Huber | F23R 3/002 60/755 |
| 2013/0232980 A1* | 9/2013 | Chen | F23R 3/045 60/754 |
| 2015/0219336 A1* | 8/2015 | Crothers | F23R 3/46 60/726 |
| 2016/0123596 A1* | 5/2016 | Hoke | F23R 3/002 60/733 |
| 2017/0227220 A1* | 8/2017 | Schilp | F23R 3/002 |
| 2017/0268777 A1* | 9/2017 | Hase | F23M 20/005 |
| 2017/0268786 A1* | 9/2017 | Cai | F02C 7/222 |
| 2018/0135531 A1 | 5/2018 | Widener et al. | |
| 2018/0187607 A1* | 7/2018 | Hughes | F23R 3/346 |

FOREIGN PATENT DOCUMENTS

JP 2013-250047 A 12/2013
JP 2017-172953 A 9/2017

* cited by examiner

*Primary Examiner* — Edwin Kang
(74) *Attorney, Agent, or Firm* — Harvest IP Law, LLP

(57) ABSTRACT

A combustor has an axial fuel staging system to allow a fuel-air mixture to be injected from two axially spaced stages using an injector for injection of a secondary fuel-air mixture. The combustor includes a liner defining a combustion chamber; a transition piece coupled to a rear end of the liner; a flow sleeve defining an annular channel by surrounding the liner and the transition piece; and at least one injector disposed on a circumferential position of the flow sleeve to inject a mixture of fuel and air into the combustion chamber. Each of the at least one injector includes an injection pipe extending radially and passing through both the flow sleeve and either of the liner and the transition piece; a plate coupled to the injection pipe; and a plurality of mixing passages formed through the plate. The combustor improves fuel-air mixing and prevents flash back.

16 Claims, 9 Drawing Sheets

COMBUSTOR WITH AXIAL FUEL STAGING SYSTEM AND GAS TURBINE HAVING THE SAME

CROSS-REFERENCE TO RELATED APPLICATION

This application claims priority to Korean Patent Application No. 10-2019-0064046, filed on May 30, 2019, the disclosure of which is incorporated herein by reference in its entirety.

BACKGROUND

Technical Field

Exemplary embodiments relate to a combustor and a gas turbine having the same, and more particularly, to a combustor that includes an axial fuel staging system to allow a fuel-air mixture to be injected from two axially spaced stages using an injector for injection of a secondary fuel-air mixture, to improve a degree of mixing of fuel and air and prevent a flash back from occurring in the injector, and a gas turbine having the same.

Related Art

Turbines are machines that convert the energy of a fluid into mechanical work, and are typically referred to as turbo machines in which a large number of buckets or blades are mounted to the circumference of each rotor. The rotors are rotated at high speed by an impingement or reaction force generated when the buckets or blades receive a discharge of the fluid, which may be water, steam, air, or gas. Thus, examples of these turbines include a water turbine using the energy of elevated water, a steam turbine using the energy of steam, and an air turbine using the energy of compressed air, and a gas turbine using the energy of high-temperature and high-pressure gas. Among these, the gas turbine is a type of internal combustion engine that converts thermal energy into mechanical energy.

In a gas turbine, high-temperature and high-pressure combustion gas is produced by mixing fuel with compressed air and burning the mixture. The combustion gas is discharged into a turbine to rotate the turbine. Having no reciprocating mechanism such as a piston in a four-stroke engine, gas turbines are advantageous in that consumption of lubricant is extremely low due to the absence of mutual friction parts such as a piston-cylinder. Amplitude is a notable characteristic of reciprocating machines, and further advantages of gas turbines include a greatly reduced amplitude while enabling high-speed motion.

The basic components of a gas turbine are a compressor, a combustor, and a turbine. The compressor produces compressed air, and the combustor produces combustion gas by burning a mixture of fuel and the compressed air. The turbine receives the combustion gas, which is a high-temperature and high-pressure gas discharged from the combustor to rotate the buckets or blades of the rotor, and thus generates power (e.g., electric power).

The combustion in the combustor is subjected to an isobaric heating process to increase the temperature of the combustion gas to a critical temperature of the turbine made of metal. That is, the combustor produces combustion gas with high energy by reaction of fuel with the high-temperature and high-pressure air discharged from the compressor and transmits the combustion gas to the turbine to drive the turbine.

In some combustors, combustion gas is produced in two axially spaced stages. Such a combustor is referred to as including an axial fuel staging (AFS) system that delivers fuel and oxidant to one or more fuel injectors located downstream from the head end of the combustor. In a combustor having the AFS system, fuel and air (or a primary fuel-air mixture) are axially injected into a primary combustion zone through primary fuel nozzles at the upstream end of the combustor. Then, fuel and air (or a secondary fuel-air mixture) are injected, by AFS fuel injectors located downstream from the primary fuel nozzles, into a secondary combustion zone located downstream from the primary combustion zone.

The downstream injection of the secondary fuel-air mixture into the secondary combustion zone by the AFS injectors produces a cross flow in the secondary combustion zone. The cross flow produced in the secondary combustion zone generally traverses the flow of combustion products from the primary combustion zone and may cause a flash back of the secondary fuel-air mixture due to the flow of combustion products from the primary combustion zone.

In addition, axially staged injection improves the chances of complete combustion of available fuel, which results in a reduction in air pollution emissions. That is, when introducing the mixture of fuel and air into the secondary combustion zone, the mixing capabilities of the AFS injectors have effects on both the overall operating efficiency of the gas turbine and the status of the exhaust gas exiting the gas turbine.

SUMMARY

Aspects of one or more exemplary embodiments provide an improved combustor that includes an axial fuel staging system to allow a fuel-air mixture to be injected from two axially spaced stages using an injector for injection of a secondary fuel-air mixture, to improve a degree of mixing of fuel and air and to prevent a flash back from occurring in the injector. A further aspect provides a gas turbine including the improved combustor.

The exemplary embodiments are not limited to the above-mentioned aspects, and other aspects of the exemplary embodiments can be clearly understood by those skilled in the art to which the disclosure pertains from the following description.

According to an aspect of an exemplary embodiment, there is provided a combustor including a liner defining a combustion chamber; a transition piece coupled to a rear end of the liner; a flow sleeve defining an annular channel by surrounding the liner and the transition piece; and at least one injector disposed on a circumferential position of the flow sleeve and configured to inject a mixture of fuel and air into the combustion chamber. Each of the at least one injector may include an injection pipe extending radially and passing through both the flow sleeve and either of the liner and the transition piece; a plate coupled to the injection pipe; and a plurality of mixing passages formed through the plate.

Each of the at least one injector may further include a plurality of fuel ports through which fuel is injected into the plurality of mixing passages from a fuel plenum defined in the plate. The fuel ports may be disposed to face each other in each of the mixing passages of the plate.

The combustor may further include a fuel supply channel that extends in an axial direction of the flow sleeve and is configured to supply the fuel to the fuel plenum.

The injection pipe may include a cylindrical pipe.

The injection pipe may include a narrowed portion formed on a downstream side of the plate, the narrowed portion including a first end disposed toward the flow sleeve and a second end disposed toward the liner or the transition piece, the narrowed portion becoming narrower from the first end to the second end. The narrowed portion of the injection pipe may has an inclination of 30° to 60°.

The combustor may further include a guide member coupled to the plate and configured to guide the mixture of fuel and air exiting the plurality of mixing passages to a radial center of the injection pipe. The guide member may have a cone shape. The narrowed portion of the injection pipe may include outer surfaces that are inclined with respect to the liner or the transition piece, the guide member may include outer surfaces that are inclined with respect to an axial center line of the annular channel, and the inclination of the narrowed portion may be substantially equal to the inclination of the guide member.

The combustor may further include a damper for defining a constant volume, the damper establishing an internal volume of the damper that is separate from an external volume of the damper and having at least one communication hole enabling communication between the internal and external volumes. The damper may be coupled to the plate and configured to cover the plate. The combustor may further include a cylinder slidably coupled to the communication hole; and a communication channel formed through the cylinder and configured to communicate with the internal and external volumes.

The at least one injector may consist of a plurality of injectors disposed on a single plane that passes through a circumference of the flow sleeve. Each of the plurality of injectors may have an axial center line and be disposed at an inclined angle formed by the axial center line intersecting a tangent line of the flow sleeve drawn to intersect the axial center line, and the plurality of injectors may include one or more injectors disposed at an inclined angle that is different from the inclined angle of other injectors of the plurality of injectors.

The plurality of mixing passages may be arranged so as to be uniformly distributed in the plate.

The combustor may further include a plurality of nozzle assemblies coupled to the liner and configured to inject a primary mixture of fuel and air into a primary combustion zone for one of two axial fuel stages. The mixture of fuel and air of the at least one injector may be a secondary mixture of fuel and air to be injected into a secondary combustion zone occurring in the combustion chamber downstream from the primary combustion zone.

According to an aspect of another exemplary embodiment, there is provided a gas turbine including a compressor configured to compress air; a combustor configured to produce combustion gas by mixing fuel with the compressed air and burning the mixture; and a turbine configured to generate a rotational force from the combustion gas. The combustor of the gas turbine is consistent with the above combustor.

It is to be understood that both the foregoing general description and the following detailed description of exemplary embodiments are exemplary and explanatory and are intended to provide further explanation of the disclosure as claimed.

BRIEF DESCRIPTION OF THE DRAWINGS

The above and other aspects will become more apparent from the following description of the exemplary embodiments with reference to the accompanying drawings, in which.

DETAILED DESCRIPTION

Figure 1:
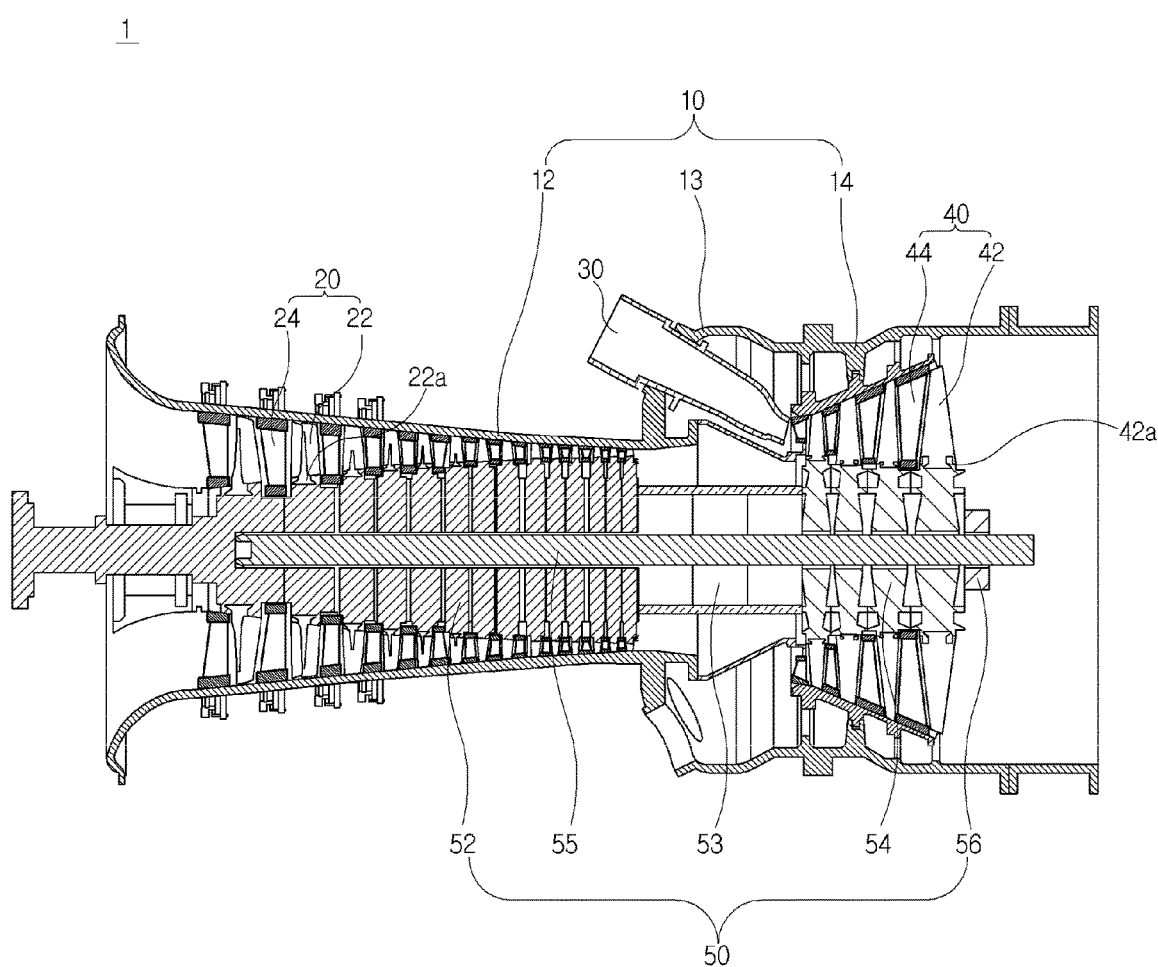
FIG. 1 is a sectional view of a gas turbine in which may be applied a combustor according to the present disclosure.

Hereinafter, a combustor and a gas turbine having the same according to exemplary embodiments will be described with reference to the accompanying drawings.

In addition, the terms as used herein are terms defined in consideration of functions of the disclosure and may change depending on the intention or practice of a user or an operator. The following embodiments are not intended to limit the scope of the disclosure but are merely illustrative of the components set forth in the appended claims.

For clear explanation of the disclosure, parts irrelevant to the description may be omitted in the drawings, and like reference numerals refer to like or similar parts throughout the specification. In the whole specification, it will be understood that when a component is referred to as "comprising" or "including" any component, it does not exclude other components, but can further comprise or include the other components unless otherwise specified.

Figure 2:
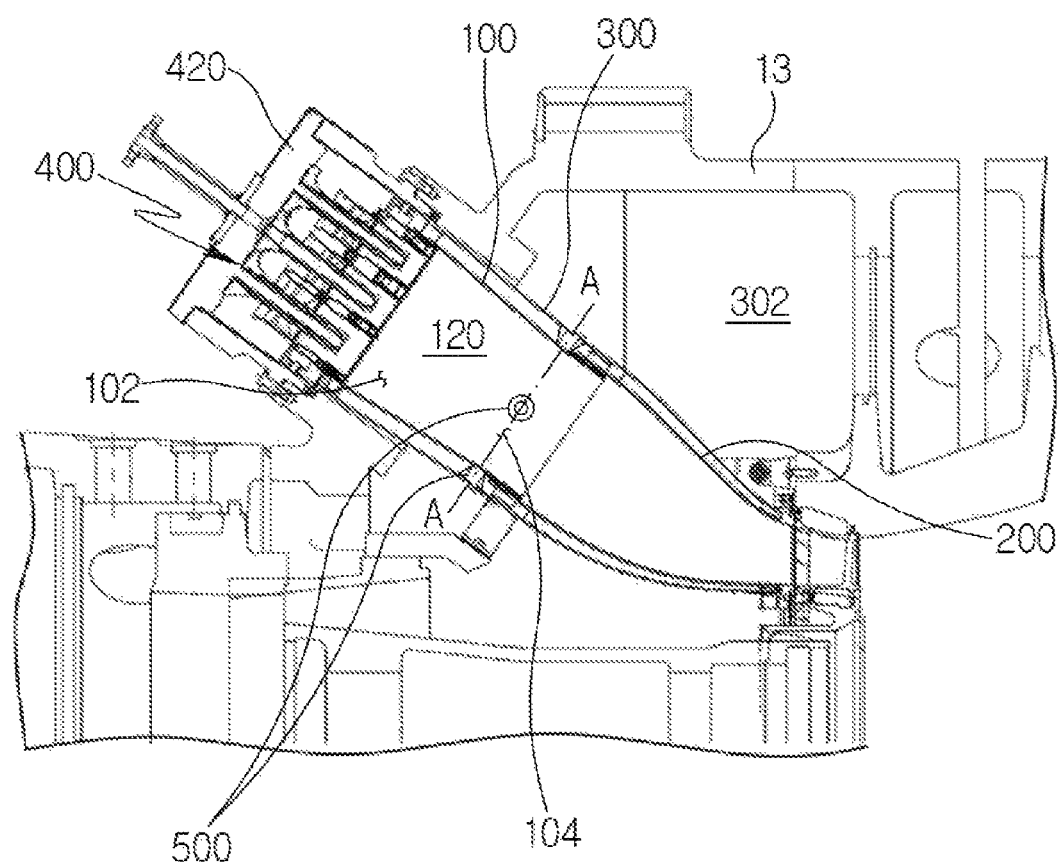
FIG. 2 is a sectional view of a combustor according to the present disclosure.

First, a configuration of a gas turbine 1 will be described with reference to FIGS. 1 and 2.

The gas turbine 1 may largely include a casing 10, a compressor 20 that sucks and compresses air to a high pressure, a combustor 30 that mixes fuel with the air compressed by the compressor 20 to burn the mixture, and a turbine 40 that generates a rotational force with the combustion gas, transmitted from the combustor 30, to generate electric power.

The casing 10 may include a compressor casing 12 for housing the compressor 20, a combustor casing 13 for housing the combustor 30, and a turbine casing 14 for housing the turbine 40. Here, the compressor casing 12, the combustor casing 13, and the turbine casing 14 may be arranged sequentially from upstream to downstream in the direction of fluid flow.

A rotor (center shaft) 50 may be rotatably provided in the casing 10, a generator (not illustrated) may be connected to the rotor 50 for power generation, and a diffuser may be provided downstream in the casing 10 to discharge the combustion gas having passed through the turbine 40.

The rotor 50 may include a compressor rotor disk 52 that is also housed in the compressor casing 12, a turbine rotor disk 54 that is also housed in the turbine casing 14, and a torque tube 53 that is also housed in the combustor casing 13 to connect the compressor rotor disk 52 to the turbine rotor disk 54. The rotor 50 may further include a tie rod 55 and a fixing nut 56 that fasten the compressor rotor disk 52, the torque tube 53, and the turbine rotor disk 54 to each other.

The compressor rotor disk 52 may consist of a plurality (e.g., fourteen) of compressor rotor disks arranged in the axial direction of the rotor 50. That is, the compressor rotor disks 52 may be formed in a multistage manner. In addition, each of the compressor rotor disks 52 may have a substantially disk shape, and the outer periphery of each compressor rotor disk 52 may have a compressor blade coupling slot for coupling a compressor blade 22 to be described later.

The turbine rotor disk 54 may be formed similar to the compressor rotor disk 52. That is, the turbine rotor disk 54 may consist of a plurality of turbine rotor disks arranged in the axial direction of the rotor 50. That is, the turbine rotor disks 54 may be formed in a multistage manner. In addition, each of the turbine rotor disks 54 may have a substantially disk shape, and the outer periphery of each turbine rotor disk 54 may have a turbine blade coupling slot for coupling a turbine blade 42 to be described later.

The torque tube 53 is a torque transmission member that transmits the rotational force of the turbine rotor disk 54 to the compressor rotor disk 52. One end of the torque tube 53 may be fastened to the farthest downstream compressor rotor disk 54, and the other end may be fastened to the farthest upstream turbine rotor disk 54. Here, each of opposite ends of the torque tube 53 may have a protrusion for respectively engaging with grooves formed in each of the compressor rotor disk 52 and the turbine rotor disk 54. Thus, it is possible to prevent the torque tube 53 from rotating relative to the compressor rotor disk 52 and the turbine rotor disk 54.

The torque tube 53 may have a hollow cylindrical shape such that the air supplied from the compressor 20 flows to the turbine 40 through the torque tube 53. The torque tube 53 may be formed to resist deformation and distortion due to the characteristics of the gas turbine that continues to operate for a long time, and may be easily assembled and disassembled for easy maintenance.

The tie rod 55 may pass through the plurality of compressor rotor disks 52, the torque tube 53, and the plurality of turbine rotor disks 54. One end of the tie rod 55 may be fastened to the farthest upstream compressor rotor disk 52, and the other end may protrude from the farthest downstream turbine rotor disk 54 so as to be fastened to the fixing nut 56. Here, the fixing nut 56 presses the farthest downstream turbine rotor disk 54 toward the compressor 20 to reduce the distance between the farthest upstream compressor rotor disk 52 and the farthest downstream turbine rotor disk 54, to compress the plurality of compressor rotor disks 52, the torque tube 53, and the plurality of turbine rotor disks 54 in the axial direction of the rotor 50. Therefore, it is possible to prevent the axial movement and relative rotation of the plurality of compressor rotor disks 52, the torque tube 53, and the plurality of turbine rotor disks 54.

Although one tie rod is illustrated as passing through the centers of the plurality of compressor rotor disks, the torque tube, and the plurality of turbine rotor disks in the present embodiment, the present disclosure is not limited to this configuration. For example, a separate tie rod may be provided in each of the compressor and the turbine, a plurality of tie rods may be arranged circumferentially and radially, or a combination of the two schemes may be used.

According to the above-described configuration, the rotor 50 may be rotatably supported at both ends by bearings, and one end of the rotor 50 may be connected to the drive shaft of the generator.

The compressor 20 may include a compressor blade 22 that rotates together with the rotor 50, and a compressor vane 24 that is installed in the compressor casing 12 to align the flow of the air introduced into the compressor blade 22.

The compressor blade 22 may consist of a plurality of compressor blades arranged in a multistage manner in the axial direction of the rotor 50, and the plurality of compressor blades 22 may be formed radially in the direction of rotation of the rotor 50 for each stage.

Each of the compressor blades 22 may have a root 22a that is coupled to the compressor blade coupling slot of the compressor rotor disk 52. The root 22a may have a fir-tree shape to prevent the compressor blade 22 from being decoupled from the compressor blade coupling slot in the radial direction of the rotor 50. In this case, the compressor blade coupling slot may also have a fir-tree shape so as to correspond to the root 22a of the compressor blade.

Although the compressor blade root 22a and the compressor blade coupling slot are illustrated as having the fir-tree shape in the present embodiment, the present disclosure is not limited to this coupling method. For example, a dovetail shape may be utilized, or the compressor blade may be coupled to the compressor rotor disk using a fixture such as a key or a bolt.

Typically, the coupling of the compressor rotor disk 52 and the compressor blade 22 may be a tangential type or an axial type. In the present embodiment, the compressor blade root 22a is inserted into the compressor blade coupling slot in the axial direction of the rotor 50 in the so-called axial type as described above. Thus, the compressor blade coupling slot according to the present embodiment may consist of a plurality of compressor blade coupling slots arranged radially in the circumferential direction of the compressor rotor disk 52.

The compressor vane 24 may consist of a plurality of compressor vanes arranged in a multistage manner in the axial direction of the rotor 50. Here, the compressor vanes 24 and the compressor blades 22 may be arranged alternately in the direction of air flow. In addition, the plurality of compressor vanes 24 may be formed radially in the direction of rotation of the rotor 50 for each stage.

The combustor 30 mixes fuel with the air introduced from the compressor 20 and burns the mixture to produce high-temperature and high-pressure combustion gas with high energy. The temperature of the combustion gas may be increased to a heat-resistant limit of the combustor and turbine in an isobaric combustion process.

Specifically, the combustor 30 may consist of a plurality of combustors arranged in the direction of rotation of the rotor 50 in the combustor casing.

In the present embodiment, each of the combustors 30 is equipped with an axial fuel staging system in which a first fuel-air mixture is injected and ignited into a primary combustion zone of the combustor to produce a main flow of high-energy combustion gas and a second fuel-air mixture is injected and ignited into a secondary combustion zone located downstream from the primary combustion zone. The axial fuel staging system may also be referred to as a multistage injection system or a late lean injection system. The second fuel-air mixture in the axially subsequent stage is injected into the main flow of high-energy combustion gas and mixed with the main flow, which will be discussed in detail below.

Each of the combustors 30 includes a liner 100 into which the air compressed by the compressor 20 is introduced, and a transition piece 200 that is positioned behind the liner 100 to guide the combustion gas to the turbine 40. The liner 100 defines a combustion chamber 120, and a flow sleeve 300 surrounds the liner 100 and the transition piece 200 to define an annular channel 140.

The combustor 30 includes a plurality of combustor nozzle assemblies 400 configured to mix fuel with the compressed air supplied from the compressor 20. The nozzle assemblies 400 are coupled to the front of the liner 100. An end plate 420 is coupled to the front of the combustor casing 13 or in front of the flow sleeve 300 to support the nozzle assemblies 400, thereby enabling the combustor to be sealed.

Accordingly, compressed air (combustion air) may be introduced from an accommodation space 302, which is defined by the combustor casing 13 to accommodate the compressed air discharged from the compressor 20, through a plurality of flow holes 320 formed in the flow sleeve 300, into the annular channel 140 between the liner 100 and the flow sleeve 300. As described above, the compressed air, which is introduced into the annular channel 140 between the liner 100 and the flow sleeve 300, flows to the front of the combustor to reach the end plate 420 and thereafter flows in an opposite direction to be supplied to the nozzle assemblies 400. That is, the compressed air flowing out of the compressor 20 is injected into the combustion chamber 120 while mixing with fuel through the nozzle assemblies 400, so that the mixture of fuel and air is ignited and burned by an ignition plug (not illustrated) in the combustion chamber 120.

In this case, the liner 100 may at least partially define a primary combustion zone 102, for burning a first fuel-air mixture injected by the nozzle assemblies 400, and a secondary combustion zone 104 located downstream from the primary combustion zone 102 in the axial direction of the combustor.

The combustor 30 further includes an injector 500 for injecting a second fuel-air mixture into the secondary combustion zone 104 in the axially subsequent stage.

The injector 500 is disposed downstream from the nozzle assemblies 400 and upstream from the turbine 40 in the axial direction of the combustor, and may consist of a plurality of injectors used within one combustor 30. Although the injectors 500 are illustrated as being disposed at the rear end of the liner 100 in the present embodiment, the present disclosure includes a configuration in which the injectors 500 are disposed along the transition piece 200.

The injectors 500 are spaced apart from each other in the circumferential direction of the liner 100 (or the transition piece 200). Although the injectors 500 are illustrated as being provided in a single plane in the present embodiment, the present disclosure includes a configuration in which the injectors 500 are provided in two or more axially spaced planes. Each of the injectors 500 extends radially through the liner 100 and the flow sleeve 300 to provide fluid communication between the accommodation space 302 and the combustion chamber 120. That is, the injector 500 extends in a direction transverse to the flow of compressed air in the annular channel 140.

After some of the compressed air, which is discharged from the compressor 20 and held in the accommodation space 302, is introduced into the injector 500 and mixed with fuel, the mixture of fuel and air is injected into the combustion chamber 120, namely, the secondary combustion zone 104. The second fuel-air mixture injected by the injector 500 is mixed with the high-temperature combustion gas produced in the primary combustion zone 102. The injector 500 will be described in detail below.

Meanwhile, it is important to cool the liner 100 and the transition piece 200 exposed to high-temperature and high-pressure combustion gas in order to increase the durability of the combustor. To this end, the compressed air is introduced through the flow holes 320 (FIGS. 4, 7-9) formed in the flow sleeve 300 to vertically impinge on the outer walls of the liner 100 and the transition piece 200, thereby enabling the liner and the transition piece to be cooled.

The turbine 40 may be formed similar to the compressor 20. The turbine 40 may include a turbine blade 42 that rotates together with the rotor 50, and a turbine vane 44 that is fixedly installed in the turbine casing 14 to align the flow of the air introduced into the turbine blade 42.

The turbine blade 42 may consist of a plurality of turbine blades arranged in a multistage manner in the axial direction of the rotor 50, and the plurality of turbine blades 42 may be formed radially in the direction of rotation of the rotor 50 for each stage.

Each of the turbine blades 42 may have a root 42a that is coupled to the turbine blade coupling slot of the turbine rotor disk 54. The root 42a may have a fir-tree shape to prevent the turbine blade 42 from being decoupled from the turbine blade coupling slot in the radial direction of the rotor 50. In this case, the turbine blade coupling slot may also have a fir-tree shape so as to correspond to the root 42a of the turbine blade.

The turbine vane 44 may consist of a plurality of turbine vanes arranged in a multistage manner in the axial direction of the rotor 50. Here, the turbine vanes 44 and the turbine blades 42 may be arranged alternately in the direction of air flow. In addition, the plurality of turbine vanes 44 may be formed radially in the direction of rotation of the rotor 50 for each stage.

Since, unlike the compressor 20, the turbine 40 comes into contact with high-temperature and high-pressure combustion gas, the turbine 40 requires a cooling device to prevent damage such as deterioration. To this end, the gas turbine may include a cooling channel through which the compressed air is bled from a partial position of the compressor 20 to be supplied to the turbine 40. In some exemplary embodiments, the cooling channel may extend from the outside of the casing 100 (external channel) or may extend through the inside of the rotor 50 (internal channel); in others, the cooling channel may utilize both the external channel and the internal channel.

The cooling channel may communicate with a turbine blade cooling channel defined in the turbine blade 42 to cool the turbine blade 42 with cooling air. The turbine blade cooling channel may communicate with a turbine blade film cooling hole formed in the surface of the turbine blade 42 so that the cooling air is supplied to the surface of the turbine blade 42, thereby enabling the turbine blade 42 to be cooled by the cooling air in a so-called film cooling manner. The turbine vane 44 may also be cooled by the cooling air supplied from the cooling channel, similar to the turbine blade 42.

The above gas turbine is given merely by way of example, and the combustor of the exemplary embodiments, which will be described in detail below, may be widely applied to a jet engine in which air and fuel are burned, as well as a typical gas turbine.

Hereinafter, the injectors 500 according to the first exemplary embodiment will be described in detail with reference to FIGS. 3 to 6.

As described above, the injectors 500 are arranged around flow sleeve 300, in the circumferential direction of the liner 100 or the transition piece 200, to inject the mixture of fuel and air into the secondary combustion zone 104. The injectors 500 may be spaced apart from each other at regular intervals around the liner 100. In the present embodiment, the plurality of injectors 500 may include four injectors.

Figure 3:
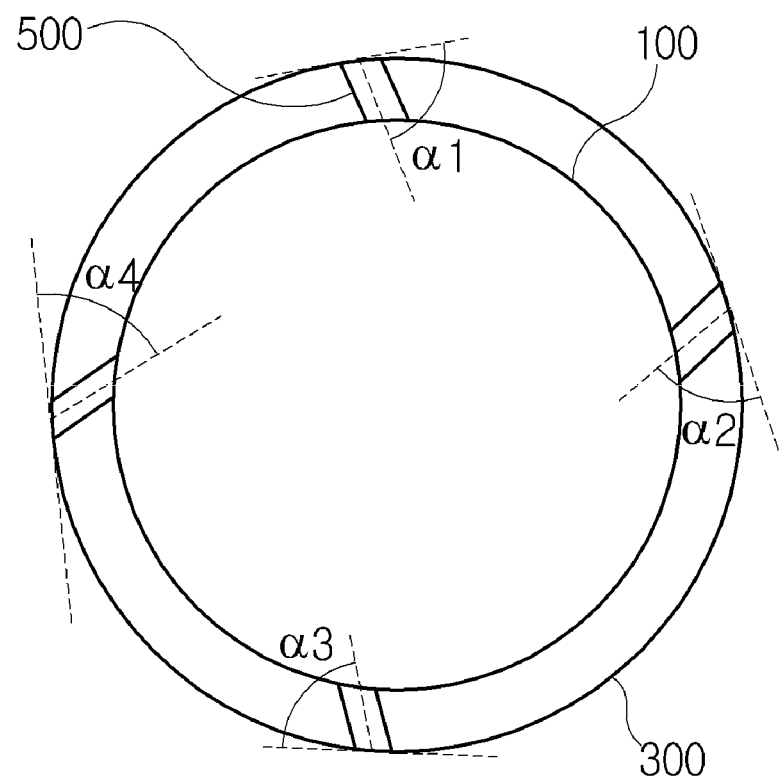
FIG. 3 is a cross-sectional view taken along line A-A of FIG. 2.

As illustrated in FIG. 3, an axial center line is drawn through each of the injectors 500 in the longitudinal direction and forms a predetermined angle α1, α2, α3, or α4 with the tangent line of the flow sleeve 300 drawn to intersect the axial center line. The point of tangency occurs at a position where the corresponding injector is installed along the circumference of the liner 100, and the center lines are determined by the installation of the respective injectors 500.

Although the exemplary embodiment of FIG. 3 depicts the angles α1, α2, α3, and α4 as all being different, the present disclosure is not limited to this configuration. For example, at least some of the predetermined angles α1, α2, α3, and α4 formed by the center lines of the respective injectors 500 and the associated tangent lines of the liner 100 may be the same as one another, while at least some of the others may differ from one another. Thus, among the secondary fuel-air mixtures injected from the respective injectors 500 into the secondary combustion zone 104, individual secondary fuel-air mixtures may be injected at different angles, so that the shape of the flame in the secondary combustion zone 104 may be adjusted, thereby reducing the combustion vibration of the combustor.

Figure 4:
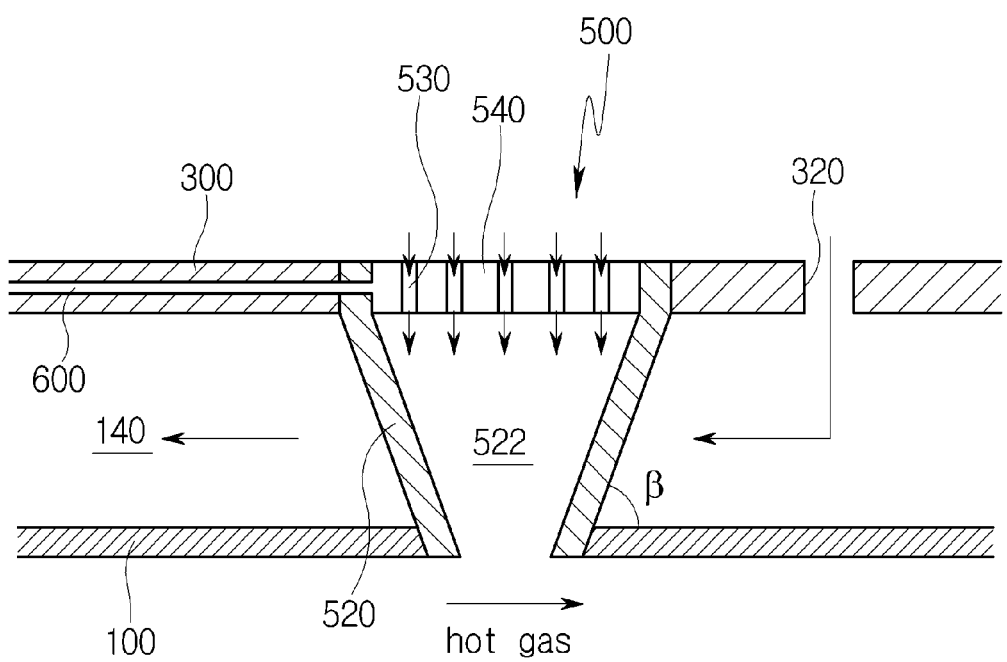
FIG. 4 is a sectional view of a periphery surrounding one injector of FIG. 2 according to a first exemplary embodiment of the present disclosure.
Figure 5:
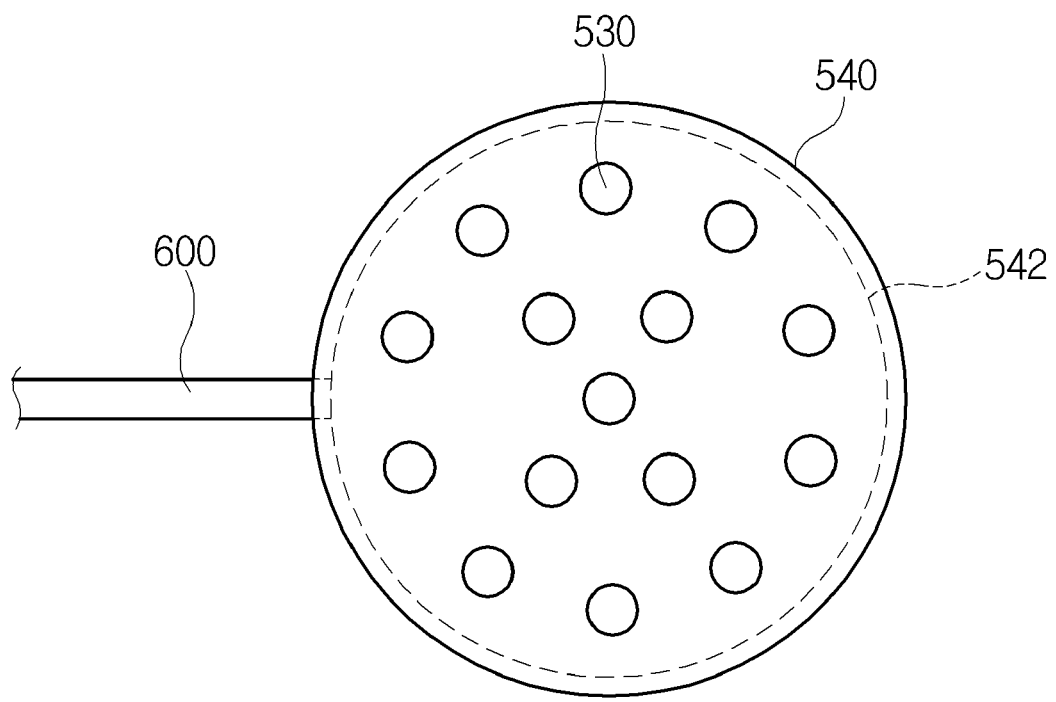
FIG. 5 is a top view of the injector of FIG. 4.
Figure 6:
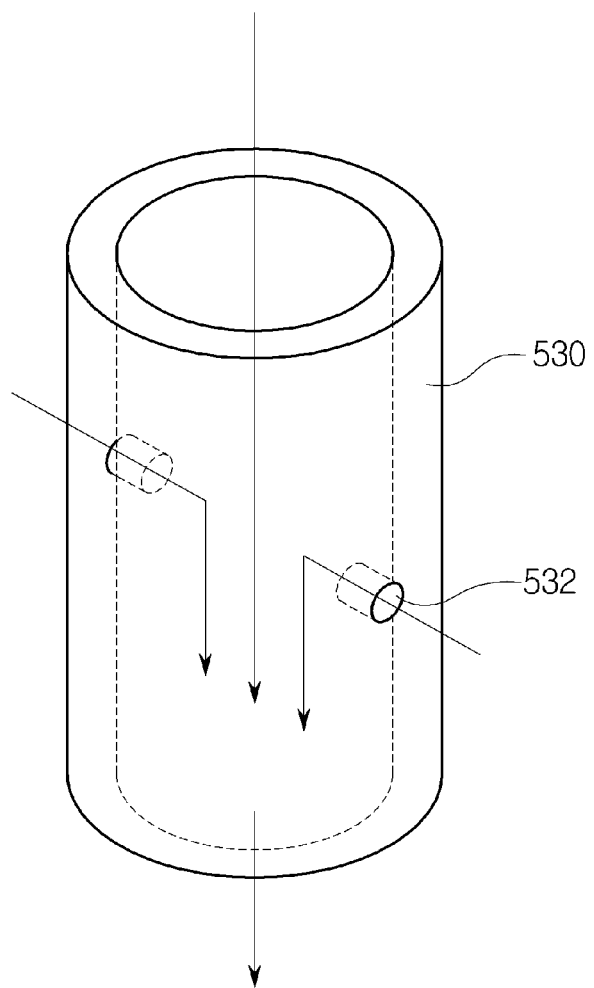
FIG. 6 is a perspective view of a portion of a perforated plate of the injector of FIG. 4.

A structure of each of the injectors 500 will be described in detail with reference to FIGS. 4 to 6.

Each of the injectors 500 may include an injection pipe 520, a plate 540 coupled to the injection pipe 520, and a plurality of mixing passages 530 formed through the plate 540. The injection pipe 520 extends radially and passes through both the liner 100 and the surrounding flow sleeve 300. In some embodiments, the radially extending injection pipe 520 may pass through both the transition piece 200 and the surrounding flow sleeve 300. Although the plate 540 is illustrated as being coupled to a radially outward end of the injection pipe 520 in the present embodiment, the present disclosure includes a configuration in which the plate 540 is coupled to the flow sleeve 300 at the radially outward end of the injection pipe 520.

In more detail, the injection pipe 520 may be cylindrical and may define an injection passage 522. The injection pipe 520 allows the accommodation space 302 to communicate with the combustion chamber 120 in the liner 100, and extends through the annular channel 140 to the liner 100 to inject the secondary fuel-air mixture into the secondary combustion zone 104. In some exemplary embodiments, the injection pipe 520 may also protrude past the liner 100, that is, into the secondary combustion zone 104.

The plate 540 coupled to the injection pipe 520 is provided with the mixing passages 530 in which fuel and air are mixed. As illustrated in FIG. 5, the mixing passages 530 may be arranged so as to be uniformly distributed in the plate 540.

The mixing of fuel and air in each of the mixing passages 530 will now be described.

Each of the mixing passages 530 has one end (the radially outer end) that communicates with the accommodation space 302 so that the compressed air, discharged from the compressor and held in the accommodation space 302, may be introduced from the accommodation space 302 into the mixing passage 530. The other end (the radially inward end) of the mixing passage 530 extends to communicate with the injection passage 522.

The plate 540 defines a fuel plenum 542 (FIG. 5) formed within the plate 540. The fuel plenum 542 may include a predetermined space surrounding the arrangement of the mixing passages 530. Each of the mixing passages 530 is provided with at least one fuel port 532 to inject fuel from the fuel plenum 542 into the mixing passage 530. In the present embodiment, the mixing passage 530 is provided with two fuel ports 532 facing each other. Therefore, it is possible to improve a degree of mixing by mutual impingement of fuel respectively injected from the two fuel ports 532. In some exemplary embodiments, the fuel ports may be provided in a multistage manner in the longitudinal direction of each mixing passage.

The combustor may further include a fuel supply channel 600 that extends in the axial direction of the flow sleeve 300 to supply fuel to the fuel plenum 542. The fuel supply channel 600 is connected to an external fuel source (not illustrated) to supply fuel to the fuel plenum 542. Although the fuel supply channel 600 is illustrated as being accommodated in the flow sleeve 300 in the present embodiment, the present disclosure includes a configuration in which the fuel supply channel 600 is formed between the liner and the flow sleeve.

Accordingly, after the fuel injected into the mixing passages 530 through the fuel ports 532 is mixed with the compressed air introduced into the mixing passages 530 from the accommodation space 302, the mixture of fuel and air enters the injection passage 522. In each of the mixing passages 530, the fuel and the air can be effectively mixed with each other while flowing in the axial direction of the mixing passage.

In this case, at least a portion of the injection pipe 520 may become narrower from the flow sleeve 300 toward the liner 100 so that the mixture of fuel and air introduced into the injection passage 522 of the injection pipe 520 from the mixing passage 530 flows at an increasing rate while passing through the injection passage 522. In the present embodiment, the injection pipe 520 has a width that decreases from the downstream side of the plate 540 to the downstream end of the injection pipe 520 extending toward the liner 100. The narrowed portion of the injection pipe 520 may have an inclination angle β of 30 to 60° with respect to the liner 100.

Accordingly, the secondary fuel-air mixture may be injected into the secondary combustion zone 104 at a higher rate while flowing through the injection passage 522, and it is possible to prevent a flash back of the secondary fuel-air mixture due to the flow of combustion products produced by combustion in the primary combustion zone 102, namely, due to the flow of hot gas.

Next, injectors 2500 according to a second exemplary embodiment will be described with reference to FIG. 7.

The injectors 2500 according to the second exemplary embodiment have the same configuration as the above-mentioned injectors 500 according to the first exemplary embodiment, except that each of the injectors 2500 further includes a guide member 2700 coupled to the plate 540 to guide a mixture of fuel and air introduced from each of the passages 530 into the injection pipe 520.

In the present embodiment, the guide member 2700 is coupled to the center of the downstream side of the plate 540 and includes a distal end that extends toward the liner 100. The guide member 2700 serves to guide the mixture of fuel and air, introduced from the mixing passage 530 into the injection passage 522, to the radial center of the injection passage 522.

In the present embodiment, the guide member 2700 has a cone shape. In this case, the outer surfaces of the guide member 2700 may have an inclination angle γ of 30° to 60°. with respect to an axial center line of the annular channel 140. The inclination (β) of the narrowed portion of the injection pipe 520 may be equal to or substantially equal to that (γ) of the guide member 2700.

As described above, a strong central flow of the second fuel-air mixture may be formed as the guide member 2700 guides the second fuel-air mixture to the center of the injection pipe 520, and the injection pipe 520 enables the second fuel-air mixture to flow at a higher rate.

Figure 7:
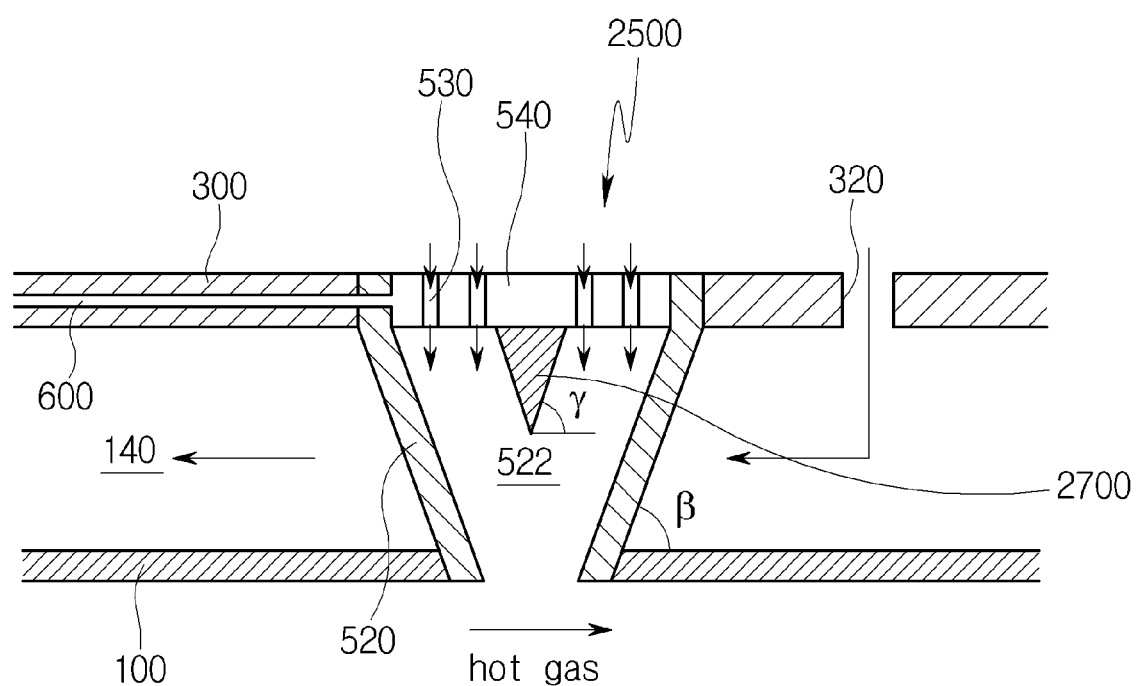
FIG. 7 is a sectional view of a periphery surrounding one injector of FIG. 2 according to a second exemplary embodiment of the present disclosure.

Although FIG. 7 shows no mixing passage 530 formed at the center of the plate coupled with the guide member 2700 since the guide member 2700 is a solid formation, the present disclosure includes a configuration in which the guide member 2700 includes a hollow space for passing a secondary fuel-air mixture. For example, the guide member 2700 may have a hollow frustum shape or the like so that a mixing passage 530 may also be disposed at the center of the plate 540, in which case the secondary fuel-air mixture flows into the hollow guide member through the centrally disposed mixing passage.

Figure 8:
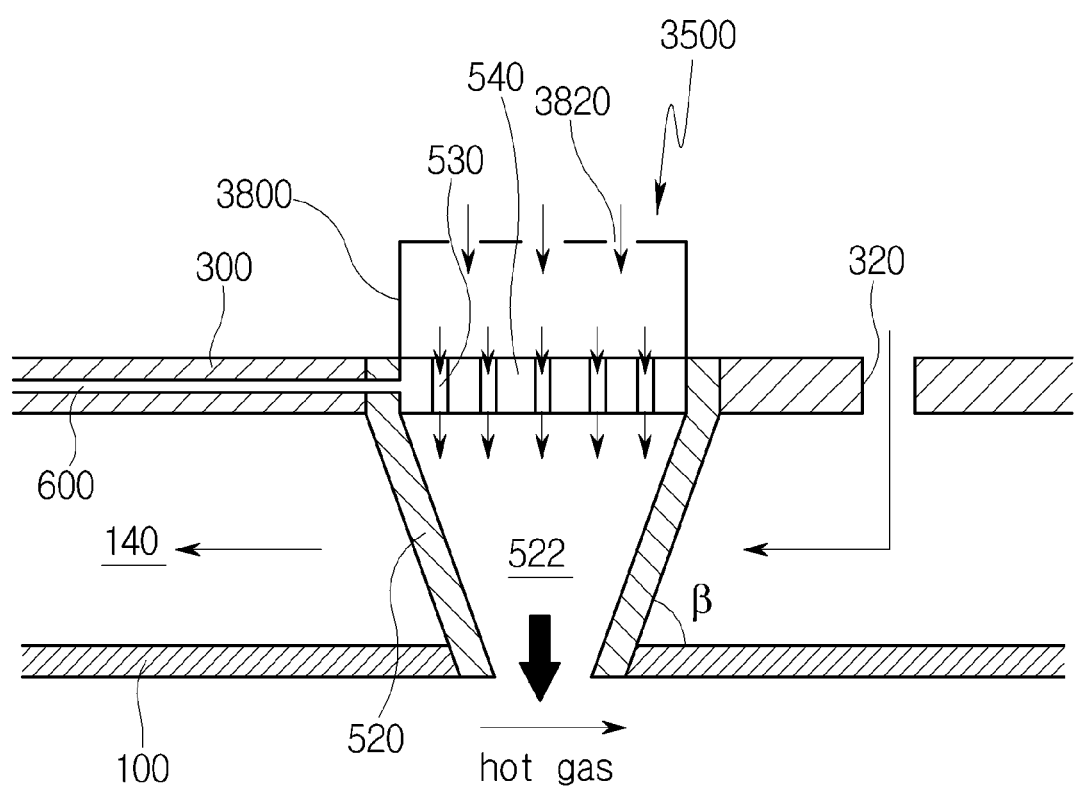
FIG. 8 is a sectional view of a periphery surrounding one injector of FIG. 2 according to a third exemplary embodiment of the present disclosure.

Next, injectors 3500 according to a third exemplary embodiment will be described with reference to FIG. 8.

The injectors 3500 according to the third exemplary embodiment have the same configuration as the above-mentioned injectors 500 according to the first exemplary embodiment, except that each of the injectors 3500 further includes a damper 3800 having at least one communication hole 3820 allowing for communication between the inside and outside of the damper 3800, the outside of the damper 3800 being the accommodation space 302. The damper 3800 is coupled to the upstream side of the plate 540 to cover the plate 540. The damper 3800 may have the same size as the plate 540 and thus may entirely cover the upstream side of the plate 540. In addition, the damper 3800 has a predetermined height with respect to the plate 540 to define a constant volume.

The damper 3800 is formed by a radially outward facing surface and side surfaces that communicate with the radially outward facing surface and the plate 540. The at least one communication hole 3820, which allows for the communication between the internal volume of the damper 3800 and the external volume of the accommodation space 302, may be formed in either or both of the radially outward facing surface or the side surfaces of the damper 3800. The dampers 3800, which are included in the respective injectors 3500 installed around the flow sleeve 300, may have different internal volumes.

Accordingly, combustion vibration can be reduced as the compressed air in the accommodation space 302 flows into the internal volume of the damper 3800 through the communication holes 3820 and enters the mixing passages 530 of the plate.

Figure 9:
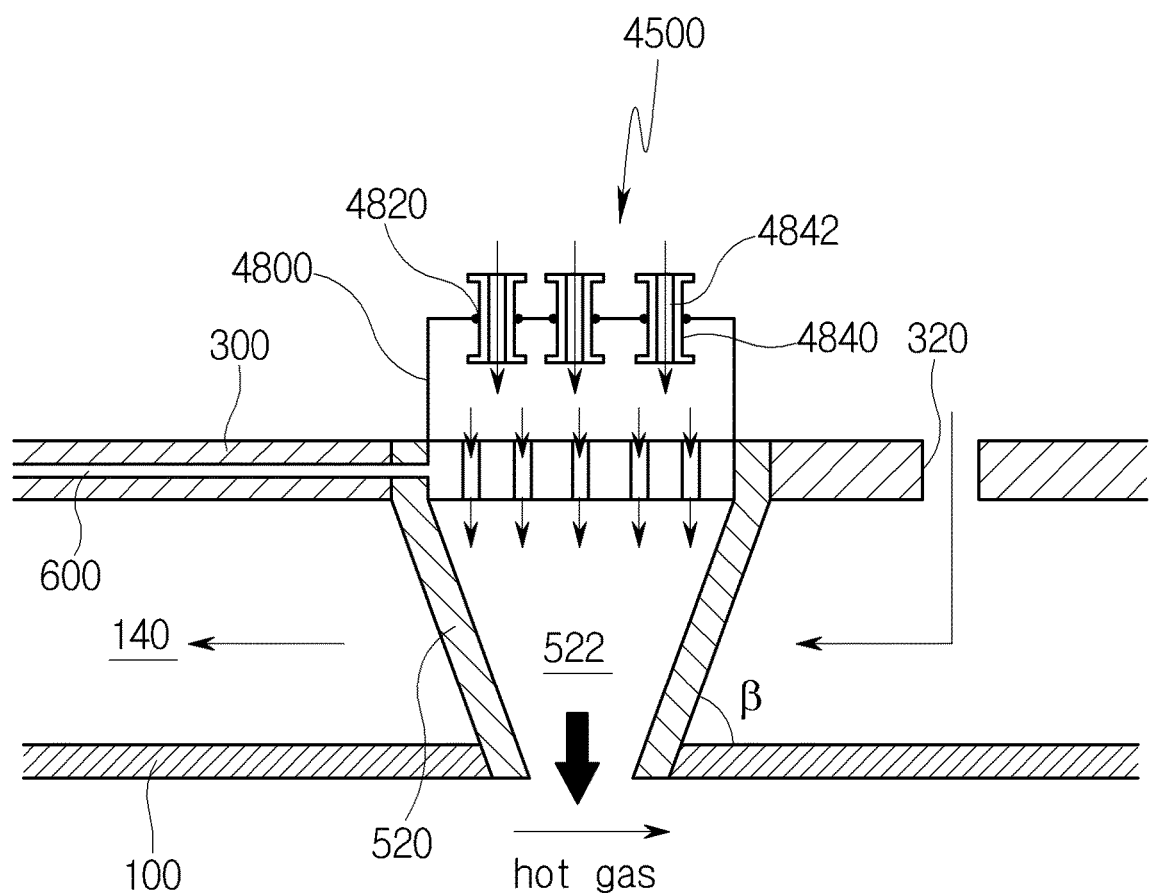
FIG. 9 is a sectional view of a periphery surrounding one injector of FIG. 2 according to a fourth exemplary embodiment of the present disclosure.

Finally, injectors 4500 according to a fourth exemplary embodiment will be described with reference to FIG. 9.

The injectors 4500 according to the fourth exemplary embodiment have the same configuration as the above-mentioned injectors 500 according to the first exemplary embodiment, except that each of the injectors 4500 further includes a damper 4800 and at least one cylinder 4840. The damper 4800 includes at least one communication hole 4820 and is otherwise is consistent with the damper 3800.

The at least one cylinder 4840 is slidably coupled in its axial direction to the at least one communication hole 4820. Each cylinder 4840 includes a communication channel 4842 formed through the cylinder 4840 between the internal and external volumes and may be configured to slide on bearings (not shown). The length of the cylinder 4840 protruding into the damper 4800 may vary as the cylinder 4840 slides in the communication hole 4820, with the consequence that the internal volume of the damper 4800 may change. Although the cylinder is illustrated as being coupled to each of the communication holes in the present embodiment, a cylinder may be coupled to only a portion of the plurality of communication holes.

The communication channel 4842 of the cylinder 4840 passes through its center and thus communicates between the internal and external volumes of the damper 4800. Accordingly, combustion vibration can be reduced as the compressed air in the accommodation space 302 (external volume) flows into the internal volume of the damper 4800 through the communication channels 4842 of the cylinders 4840 and enters the mixing passages 530 of the plate 540.

According to the exemplary embodiments, it is possible to reduce a degree of nitrogen oxide (NOx) emission in the gas turbine since fuel and air are premixed and burned in the primary combustion zone of the combustor and a mixture of fuel and air is directly injected through the injector into the secondary combustion zone of the combustor located downstream from the primary combustion zone.

In this case, since the injector configured to inject the mixture of fuel and air into the secondary combustion zone includes a plate having a plurality of passages in which fuel and air are mixed, it is possible to enhance a mixing capability of fuel and air.

In addition, the injector becomes narrower toward the secondary combustion zone so that the mixture of fuel and air may be injected into the secondary combustion zone at an increasing rate, with the consequence that it is possible to prevent a flash back from occurring due to the flow of combustion products from the primary combustion zone.

The exemplary embodiments are not limited to the above effects, and it should be understood that the exemplary embodiments include all effects which can be inferred from the detailed description of the disclosure or the configuration of the disclosure defined by the appended claims.

The exemplary embodiments should not be construed as limiting the above-mentioned specific examples and description, and it will be apparent to those skilled in the art that various variations and modifications may be made without departing from the spirit and scope of the disclosure as defined in the following claims. Therefore, these variations and modifications fall within the scope of the disclosure.

What is claimed is:

1. A combustor comprising:
   a liner defining a combustion chamber;
   a transition piece coupled to a rear end of the liner;
   a flow sleeve defining an annular channel by surrounding the liner and the transition piece; and
   at least one injector disposed on a circumferential position of the flow sleeve and configured to inject a mixture of fuel and air into the combustion chamber, each of the at least one injector comprising:
   an injection pipe extending radially and passing through both the flow sleeve and either of the liner and the transition piece;
   a plate coupled to the injection pipe;

a plurality of mixing passages formed through the plate;

a damper for defining a constant volume, the damper establishing an internal volume of the damper that is separate from an external volume of the damper and having at least one communication hole enabling communication between the internal and external volumes;

a cylinder slidably coupled through each communication hole of the at least one communication hole; and a communication channel formed through the cylinder and configured to communicate with the internal and external volumes, wherein each of the at least one injector further comprises a plurality of fuel ports through which the fuel is injected into the plurality of mixing passages from a fuel plenum defined in the plate, wherein the fuel ports are disposed to face each other in each of the plurality of mixing passages of the plate to improve a degree of mixing by mutual impingement of the fuel, and wherein the cylinder comprises a flange on each end of the cylinder.

2. The combustor according to claim 1, further comprising a fuel supply channel that extends in an axial direction of the flow sleeve and is configured to supply the fuel to the fuel plenum.

3. The combustor according to claim 1, wherein the injection pipe includes a cylindrical pipe.

4. The combustor according to claim 1, wherein the injection pipe includes a narrowed portion formed on a downstream side of the plate, the narrowed portion including a first end disposed toward the flow sleeve and a second end disposed toward the liner or the transition piece, the narrowed portion becoming narrower from the first end to the second end.

5. The combustor according to claim 4, wherein the narrowed portion of the injection pipe has an inclination of 30° to 60°.

6. The combustor according to claim 4, further comprising a guide member coupled to the plate and configured to guide the mixture of the fuel and the air exiting the plurality of mixing passages to a radial center of the injection pipe.

7. The combustor according to claim 6, wherein the guide member has a cone shape.

8. The combustor according to claim 6, wherein the narrowed portion of the injection pipe includes outer surfaces that are inclined with respect to the liner or the transition piece, wherein the guide member includes outer surfaces that are inclined with respect to an axial center line of the annular channel, and wherein the inclination of the narrowed portion is substantially equal to the inclination of the guide member.

9. The combustor according to claim 1, wherein the damper is coupled to the plate and is configured to cover the plate.

10. The combustor according to claim 1, wherein the at least one injector consists of a plurality of injectors disposed on a single plane that passes through a circumference of the flow sleeve.

11. The combustor according to claim 10, wherein each of the plurality of injectors of the at least one injector has an axial center line and is disposed at an inclined angle formed by the axial center line intersecting a tangent line of the flow sleeve drawn to intersect the axial center line, and wherein the plurality of injectors include one or more injectors disposed at an inclined angle that is different from the inclined angle of other injectors of the plurality of injectors.

12. The combustor according to claim 1, wherein the plurality of mixing passages are arranged so as to be uniformly distributed in the plate.

13. The combustor according to claim 1, further comprising a plurality of nozzle assemblies coupled to the liner and configured to inject a primary fuel and air mixture into a primary combustion zone for one of two axial fuel stages.

14. The combustor according to claim 13, wherein the mixture of the fuel and the air of the at least one injector is a secondary fuel and air mixture to be injected into a secondary combustion zone occurring in the combustion chamber downstream from the primary combustion zone.

15. A gas turbine comprising a compressor configured to compress air and form compressed air; a combustor configured to produce combustion gas by mixing fuel with the compressed air and burning a mixture of the fuel and the air; and a turbine configured to generate a rotational force from the combustion gas, wherein the combustor comprises a liner defining a combustion chamber; a transition piece coupled to a rear end of the liner; a flow sleeve defining an annular channel by surrounding the liner and the transition piece; and at least one injector disposed on a circumferential position of the flow sleeve and configured to inject the mixture of the fuel and the air into the combustion chamber, and wherein each of the at least one injector comprises:

an injection pipe extending radially and passing through both the flow sleeve and either of the liner and the transition piece;

a plate coupled to the injection pipe;

a plurality of mixing passages formed through the plate;

a damper for defining a constant volume, the damper establishing an internal volume of the damper that is separate from an external volume of the damper and having at least one communication hole enabling communication between the internal and external volumes;

a cylinder slidably coupled through each communication hole of the at least one communication hole; and a communication channel formed through the cylinder and configured to communicate with the internal and external volumes, wherein each of the at least one injector further comprises a plurality of fuel ports through which the fuel is injected into the plurality of mixing passages from a fuel plenum defined in the plate, wherein the fuel ports are disposed to face each other in each of the plurality of mixing passages of the plate to improve a degree of mixing by mutual impingement of the fuel, and wherein the cylinder comprises a flange on each end of the cylinder.

16. The gas turbine according to claim 15, wherein the combustor further comprises a plurality of nozzle assemblies coupled to the liner and configured to inject a primary fuel and air mixture into a primary combustion zone for one of two axial fuel stages, and wherein the mixture of the fuel and the air of the at least one injector is a secondary fuel and air mixture to be injected into a secondary combustion zone occurring in the combustion chamber downstream from the primary combustion zone.

* * * * *